US011865383B2

(12) United States Patent
Muin et al.

(10) Patent No.: US 11,865,383 B2
(45) Date of Patent: Jan. 9, 2024

(54) APPARATUS AND SYSTEM FOR HANDLING DANGEROUS OBJECTS IN A CLOSED VEHICLE CABIN

(71) Applicant: Airbus Operations GmbH, Hamburg (DE)

(72) Inventors: Andrew Muin, Hamburg (DE); Hendrik Segelhorst, Hamburg (DE)

(73) Assignee: Airbus Operations GmbH

( * ) Notice: Subject to any disclaimer, the term of this patent is extended or adjusted under 35 U.S.C. 154(b) by 399 days.

(21) Appl. No.: 17/336,746

(22) Filed: Jun. 2, 2021

(65) Prior Publication Data

US 2021/0379432 A1     Dec. 9, 2021

(30) Foreign Application Priority Data

Jun. 5, 2020 (DE) ..................... 10 2020 114 942.5

(51) Int. Cl.
| | | |
|---|---|---|
| *A62C 3/08* | (2006.01) | |
| *B64D 1/04* | (2006.01) | |
| *A62C 2/06* | (2006.01) | |
| *B64D 11/04* | (2006.01) | |

(52) U.S. Cl.
CPC ............... *A62C 3/08* (2013.01); *A62C 2/06* (2013.01); *B64D 11/04* (2013.01)

(58) Field of Classification Search
CPC .............. B64D 11/04; A02C 3/08; A02C 2/06
See application file for complete search history.

(56) References Cited

U.S. PATENT DOCUMENTS

| 5,913,607 | A * | 6/1999 | Lengyel, Sr. | .......... | A62C 3/002 |
| | | | | | 383/110 |
| 9,339,671 | B1 * | 5/2016 | Raj | ....................... | A62C 13/78 |
| 11,713,600 | B1 * | 8/2023 | Weng | ...................... | E05B 77/02 |
| | | | | | 382/103 |
| 2014/0209332 | A1 * | 7/2014 | Burkett | .................... | A62C 3/16 |
| | | | | | 169/49 |

(Continued)

FOREIGN PATENT DOCUMENTS

| DE | 202015106958 U1 | 1/2016 |
| EP | 3225284 A1 | 10/2017 |

(Continued)

OTHER PUBLICATIONS

German Search Report for Application No. 102020114942.5, dated Mar. 30, 2021, 9 pages (p. 2 categorizing the cited art).

(Continued)

*Primary Examiner* — Tye William Abell
(74) *Attorney, Agent, or Firm* — Lerner David LLP

(57) ABSTRACT

An apparatus for handling dangerous objects in a closed vehicle cabin includes a retaining plate for fastening of the apparatus, a housing wall which is arranged on the retaining plate, which can be packed down and which is composed of a refractory material, and an opening frame which is connected at least to the housing wall and which has a closable opening, wherein the housing wall which can be packed down can be brought into a packed-down state and into an expanded state, wherein, in the folded-out state, the housing wall, together with the retaining plate and the opening frame, provides a cavity which can be reached from outside of the housing wall through the opening.

14 Claims, 5 Drawing Sheets

(56) References Cited

U.S. PATENT DOCUMENTS

2019/0083830 A1* 3/2019 Scholtens ............... A62C 8/06

FOREIGN PATENT DOCUMENTS

| GB | 2382104 B | 3/2005 |
|----|-----------|--------|
| WO | 03041803 A1 | 5/2003 |
| WO | 2017167447 A1 | 10/2017 |

OTHER PUBLICATIONS

Extended European Search Report for European Application No. 21175317 dated Oct. 15, 2021, 8 pgs (p. 2 categorizing cited references).

* cited by examiner

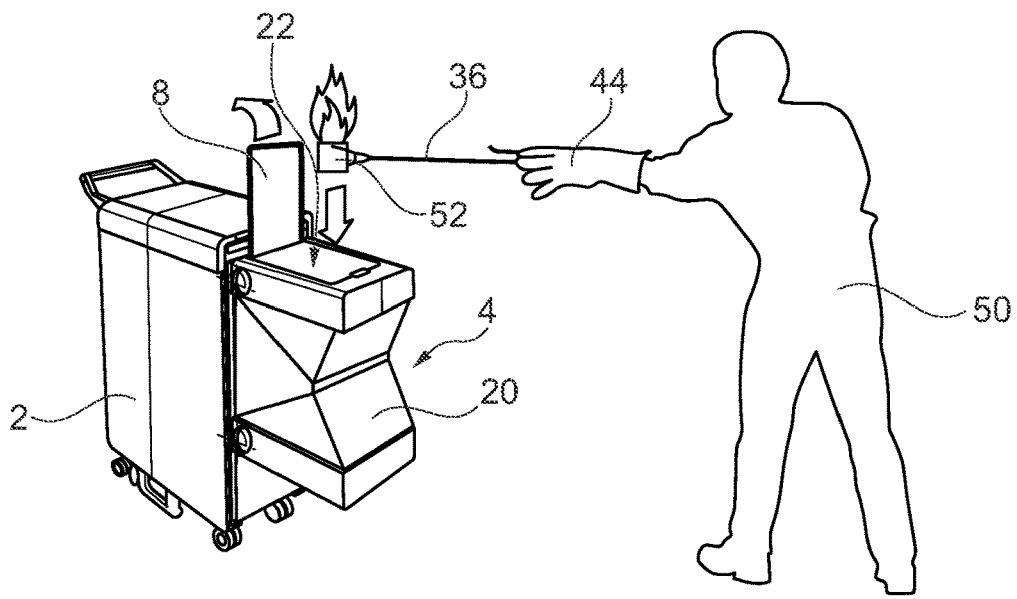
Fig. 8
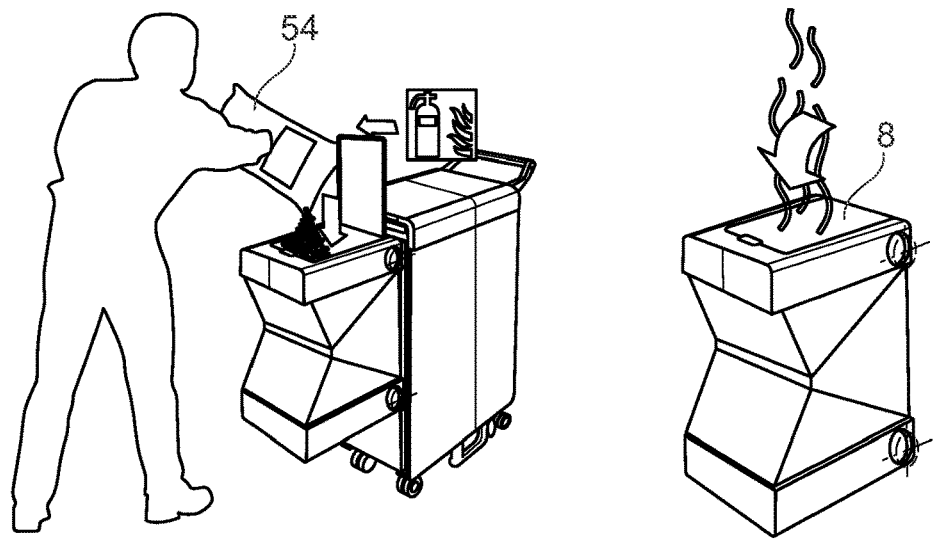
Fig. 9
Fig. 10
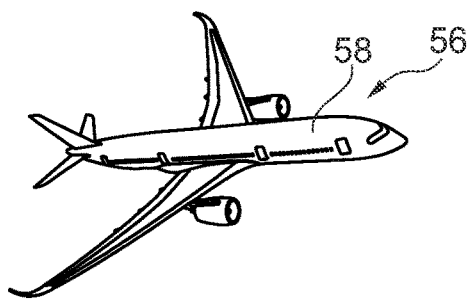
Fig. 11

APPARATUS AND SYSTEM FOR HANDLING DANGEROUS OBJECTS IN A CLOSED VEHICLE CABIN

FIELD OF THE INVENTION

The invention relates to an apparatus and a system for handling dangerous objects in a closed vehicle cabin.

BACKGROUND OF THE INVENTION

During journeys in a commercial aircraft, the passenger cabin located therein is usually closed. If dangerous objects, for example overheated electronic devices or damaged high-performance batteries, unexpectedly have to be handled inside the passenger cabin, said objects cannot be removed directly from the passenger cabin in order to curb a risk posed thereby. For example, it is known that overloading or small defects in modern electronic devices having a lithium-ion-based energy store lead to the development of fire and smoke. Depending on the operator of the aircraft, crew members may be issued with guidelines as to how fires on board the aircraft cabin should be combatted. Such situations can only be fully avoided through corresponding restraints on carrying lithium ion batteries into the passenger cabin. However, this would lead to a significant restriction of passenger comfort.

BRIEF SUMMARY OF THE INVENTION

An aspect of the invention relates to an apparatus which makes it possible to be able to readily handle dangerous objects on board an aircraft cabin and render them harmless on board at least for the duration of the flight.

An apparatus for handling dangerous objects in a closed vehicle cabin is proposed, comprising a retaining plate for fastening of the apparatus, a housing wall which is arranged on the retaining plate, which can be packed down and which is composed of a refractory material, and an opening frame which is connected at least to the housing wall and which has a closable opening, wherein the housing wall which can be packed down can be brought into a packed-down state and into an expanded state, wherein, in the folded-out state, the housing wall, together with the retaining plate and the opening frame, provides a cavity which can be reached from outside of the housing wall through the opening.

The apparatus according to an embodiment of the invention accordingly represents a simple possibility for providing a container that can be fastened in the aircraft cabin, that is fire-resistant and that is directly suitable for the safe reception of dangerous objects. A risk of fire can therefore be effectively prevented. Clear and unambiguous guidelines as to how dangerous objects in the aircraft cabin should be dealt with are also possible. The apparatus can be arranged at any desired points inside the cabin, for example in a region adjoining an aircraft galley, in an aircraft galley, on a cabin trolley, in a door region, on another monument or at any other suitable locations. The particular advantage is that a risk posed by the object in question is immediately and directly suppressed, and it is possible to safely store the object in question even in the case of relatively long flight durations.

The apparatus consists substantially of three main components. These are the retaining plate, the housing wall which can be packed down, and the opening frame. Said components together form a container which can be packed down or expanded as desired. Preferably, in a packed-down state, the apparatus is so small that it takes up only an insignificant amount of installation space inside the aircraft cabin. However, in an expanded state, said apparatus does not have to have particularly large dimensions, but rather merely has to provide a safe container for receiving relatively small objects. It is conceivable for a cavity having a volume that could lie in a range from about 1 liter to about 10 liters to be provided in the apparatus. It is optionally also possible for larger apparatuses to be provided. For larger aircraft cabins, it would also be conceivable to provide two or more such apparatuses.

The retaining plate is used as a base of the apparatus and does not necessarily have to be fixedly connected to the housing wall and the opening frame. It is rather a case that said retaining plate is used to receive the housing wall and the other components of the apparatus in order to attach them at the intended location.

The housing wall which can be packed down comprises a refractory material. The material could for example be designed to withstand a predefinable temperature in a long-lasting manner. The temperature could for instance be 300° C. Furthermore, a material that withstands a somewhat higher temperature, for example a temperature of about 350° C., 400° C. or more, at least over a predefinable time duration, could be comprised. The material could for example comprise Kevlar, which is lightweight and resistant to cutting and piercing. Even objects which are passed into the apparatus at speed, and which are possibly sharp, would not damage the housing wall.

The housing wall could for example have a zigzag fold, by way of which said housing wall can be fanned out or folded up. As an alternative, it would also be possible to use rigid segments which can be pivoted, folded, telescoped or displaced relative to one another. The housing wall has a side portion on which the opening frame is arranged. In this case, the side portion is open and is encompassed by the opening frame.

The opening frame has an opening which can be closed by a user by means of a cover flap or the like. In the case of a closed opening, the apparatus is also completely closed. If the opening is made outwardly accessible, articles can be brought through the opening and the open side portion into the interior of the housing wall. It would be possible to provide a bottom surface on a side of the housing wall that lies opposite the opening frame, said bottom surface being formed from the housing wall itself or a separate component.

If, for example, a situation in which a dangerous object has to be brought to a safe location were to arise in the aircraft cabin during a flight, the flight crew could use one hand and a suitable apparatus, for example a gripper, a glove or the like, to take hold of the object and use the other hand, for example, to fold out the apparatus, and subsequently put the article inside it. After the opening has been closed, the object no longer poses any risk, and an intense generation of heat of the object would not damage the apparatus.

In the packed-down state, the housing wall and the opening frame can rest flatly on the retaining plate. The flat resting arrangement makes it possible for the apparatus according to the invention to always be carried along in the aircraft cabin, without thereby losing a significant amount of installation space or the apparatus interfering with customary procedures in the aircraft cabin, for instance the preparation of food and beverages. In addition to the possibility of receiving burning or intensely heated objects, it would also be possible for poisonous or venomous insects or the like, which inadvertently make it into the aircraft cabin by means of clothing or luggage, to be received.

One advantageous embodiment also comprises a base plate which is connected to the housing wall. The design of the base plate could correspond to that of the opening frame, but without having an opening. In the expanded state, the housing wall then stretches from the base plate towards the opening frame. The housing wall could be closed at least on three side surfaces, which, proceeding from the retaining plate, encircle the base plate and the opening frame. Preferably, the surfaces are planar and therefore in the expanded state form substantially a cuboid.

It is preferable for the opening frame to be pivotably arranged on the retaining plate. In a packed-down state of the apparatus, the opening frame could for example be oriented in a horizontal position on a vertically arranged retaining plate. However, in the packed-down state, it would be possible for the opening frame to rest on the retaining plate in a flush manner As a result of the pivoting movement from the one position to the other position, the housing wall could follow the opening movement of the opening frame, and in this case either fold out or pack down.

Similarly, it is furthermore advantageous for the base plate to be pivotably arranged on the retaining plate so as to lie opposite the opening frame. In order to pack down the apparatus, it would accordingly be possible to pivot the opening frame and the base plate in each case in opposite or mutually facing directions, by way of which the base plate and the opening frame approach one another and the retaining plate. In the case of an inverse movement, the opening frame and the base plate move away from one another, and the previously packed-down housing wall is pulled out as a result in order to provide the cavity. In order to retain the base plate and the opening frame in the packed-down state, it could be expedient to arrange a magnetic or latching closure at the mutually facing boundary edges of these two components.

In one advantageous embodiment, the housing wall can be folded and has a plurality of connected-together wall segments. The wall segments may be stiff and plate-shaped. However, a rather more textile structure with an integrated fold is also conceivable.

In a particularly advantageous embodiment, the opening frame and the base plate have largely the same area. The apparatus can accordingly be of symmetrical design, and the housing wall can extend with a constant area between the opening frame and the base plate.

The housing wall preferably comprises a Kevlar-reinforced material. The material is consequently sufficiently robust and sufficiently fire-resistant for the intended purpose. It can be used on a frequent basis and does not have a high weight.

In one advantageous embodiment, the retaining plate has a releasable fastening element for arrangement on an object. Said fastening element could for example be limited to a hook or a cutout for plugging the retaining plate onto a hook. It could be expedient for the retaining plate to be arranged such that it hangs down for example vertically from a hook or another device which is arranged on a wall in the aircraft cabin.

It is advantageous for the apparatus to also comprise a granular material, which can be introduced into the cavity, for extinguishing a fire in the cavity. The granular material could for example be a fire-extinguishing granular material composed of expanded glass, which is particularly suitable for fires involving metal-containing and in particular lithium-containing energy stores. Said granular material generates no toxic gases during extinguishing and, for application, is for example poured out of a bag into the cavity onto the object in question.

Furthermore, it is expedient for the opening frame to be composed of a refractory material. This could for example be a metallic material, such as, for example, a particular steel alloy.

The apparatus according to an embodiment of the invention can also comprise a gripper and a holder for holding the gripper on an outer side of the apparatus. The gripper is expedient for gripping objects with a greatly elevated temperature, in order to prevent a risk of injury. Furthermore, it is conceivable for an insect or another animal which has unintentionally passed into the aircraft cabin to be safely picked up. The gripper could preferably be arranged on the side of the apparatus by means of a hook, a snap-on holder or the like.

In one preferred embodiment, the apparatus can also comprise a closable compartment for storing a fire-resistant glove. The glove could also comprise Kevlar and can permit advantageous gripping of a heated article which is poorly grippable by means of the gripper.

It is advantageous for the folded-out state to be dimensionally stable, and therefore the apparatus stands up on its own in the folded-out state. The apparatus can also be used independently of a mount on a wall. Said apparatus could be unfolded and set up on the floor or on another surface. For this purpose, it is furthermore possible to define a contact surface, which extends from the retaining plate or another rear wall of the apparatus, in order to set up the apparatus.

It is furthermore conceivable for a lockable strut to be able to be positioned between the opening frame and the base plate, said strut being able to retain the two elements in the open position. The strut could be configured to independently snap into place during the expansion of the apparatus.

Lastly, the invention relates to a system for handling dangerous objects in a closed aircraft cabin, comprising a cabin trolley and at least one apparatus according to one of the preceding claims, wherein the cabin trolley comprises a retaining apparatus in which the retaining plate of the apparatus can be mounted.

BRIEF DESCRIPTION OF THE DRAWINGS

Further features, advantages and possible uses of the present invention will emerge from the following description of the exemplary embodiments and from the figures. Here, all of the features described and/or illustrated in the figures form the subject matter of the invention individually and in any desired combination, even independently of the combination of said features in the individual claims or the back-references thereof. Furthermore, in the figures, the same reference signs are used for identical or similar objects.

FIG. 8 discloses the handling of an object.

FIGS. 9 and 10 show the extinguishing of the object in the apparatus.

FIG. 11 shows an aircraft.

DETAILED DESCRIPTION

Figure 1:
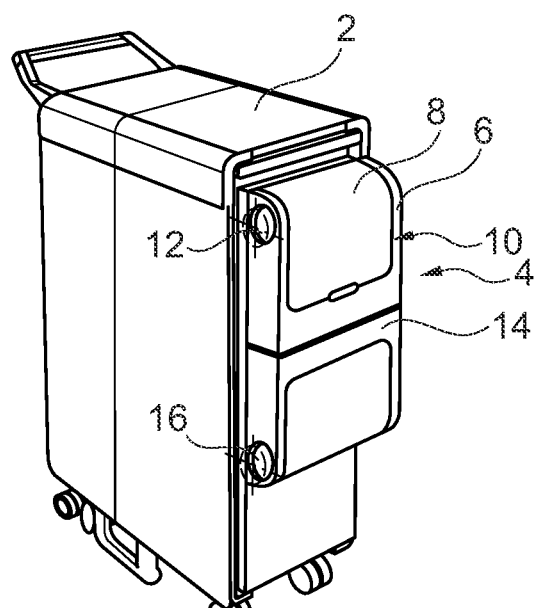
FIG. 1 shows a cabin trolley with an apparatus for handling dangerous objects in a packed-down state.
Figure 2:
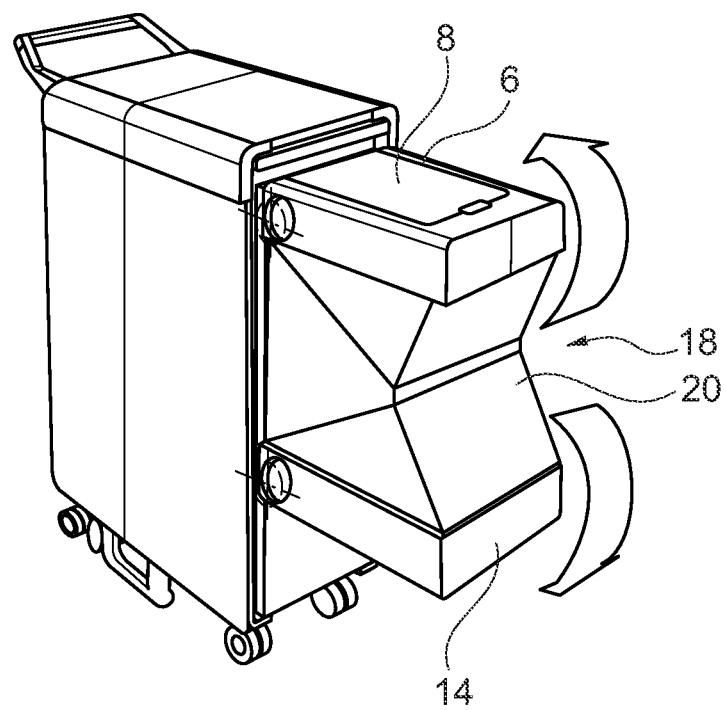
FIGS. 2 and 3 show the cabin trolley with an apparatus for handling dangerous objects in an expanded state.

FIG. 1 shows a cabin trolley 2 with an apparatus 4 for handling dangerous objects arranged thereon in a closed vehicle cabin. A retaining plate, which is not shown in detail here, is connected to the trolley 2 and can bear the apparatus 4, which consequently can always be present in the aircraft cabin and can be used when required. An opening frame 6 having an opening 10 which can be closed by means of a flap 8 is pivotably attached to the apparatus 4 by way of a first bearing 12. On a side of the apparatus 4 that lies opposite the first bearing 12, a base plate 14 is pivotably arranged on a second bearing 16. The opening frame 6 and the base plate 14 can each be pivoted through approximately 90° as a result of movement about the bearings 12 and 16. An intermediate space, in which a housing wall which can be packed down is located, is consequently defined between the opening frame 6 and the base plate 14. This is shown in FIG. 2.

Figure 3:
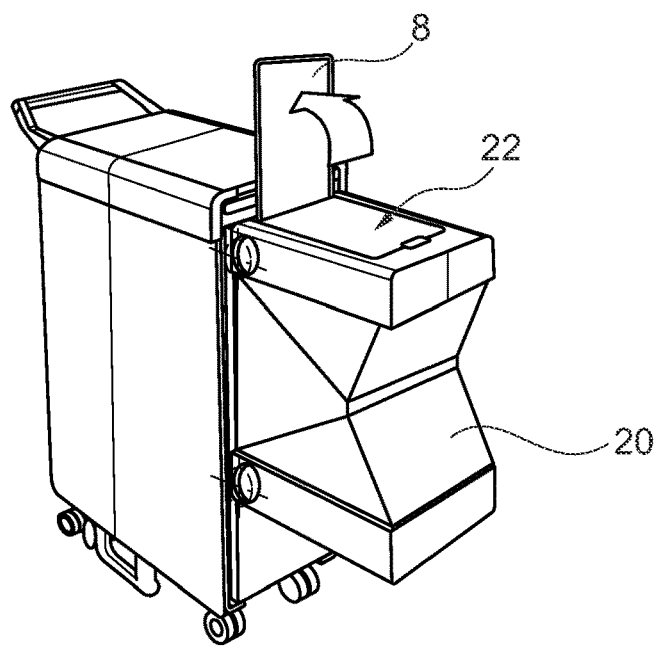

Here, the opening frame 6 and the base plate 14 have each been pivoted through 90°, and an intermediate space 18 which is produced between these elements is spanned by a foldable housing wall 20. As a result of the opening of the flap 8, it is possible to obtain a cavity in the interior of the housing wall 20. This is illustrated in FIG. 3.

The housing wall 20 preferably comprises a refractory material, which for example comprises Kevlar fibres. Here, articles which are generating an intense heat can be put inside, and therefore they no longer pose any immediate risk. As a result of the closing of the flap 8, the supply of oxygen is prevented, and therefore the apparatus 4 also functions as a type of fire-extinguishing device.

Figure 4:
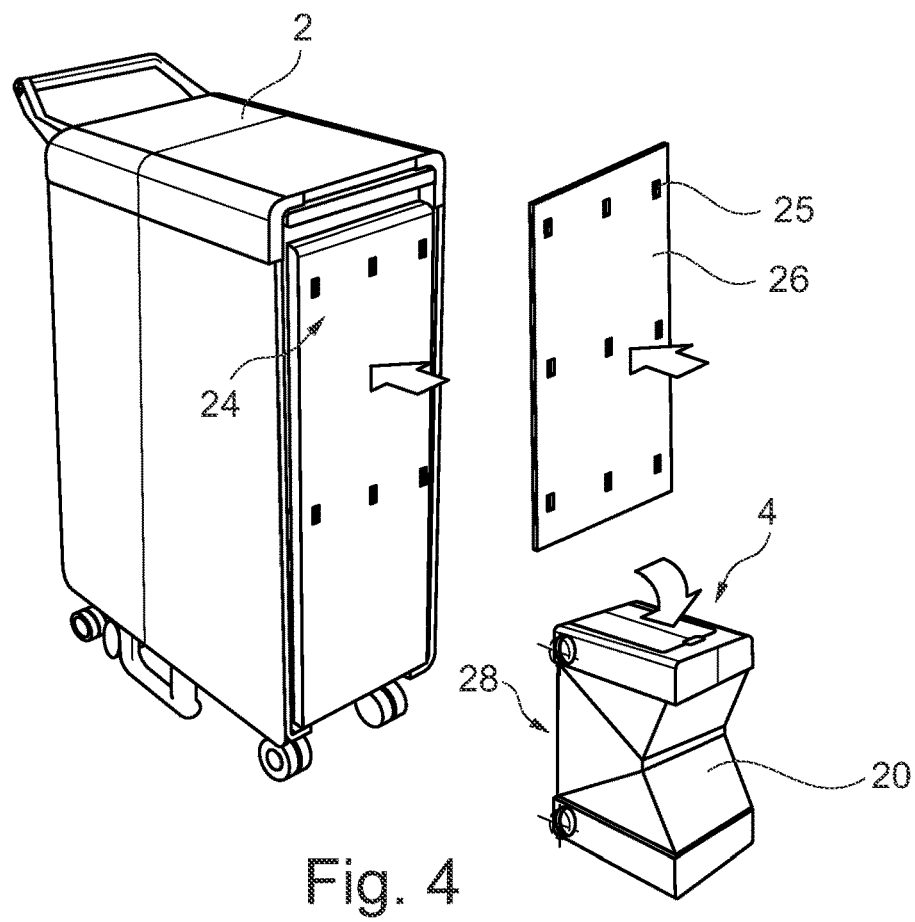
FIG. 4 shows the cabin trolley with a retaining plate and an apparatus separate therefrom.

FIG. 4 shows the cabin trolley 2 which, at the end side, comprises a retaining apparatus 24 that can be connected to a retaining plate 26. Said retaining plate could either be fixedly or removably connected to a rear side 28 of the apparatus 4. The retaining apparatus 24 and the retaining plate 26 may have devices which are formed so as to be complementary to one another and which for example comprise hooks and cutouts. In the exemplary embodiment shown, the retaining plate 26 has a fastening element 25 in the form of several cutouts, which can be introduced into the retaining apparatus 24.

Figure 5:
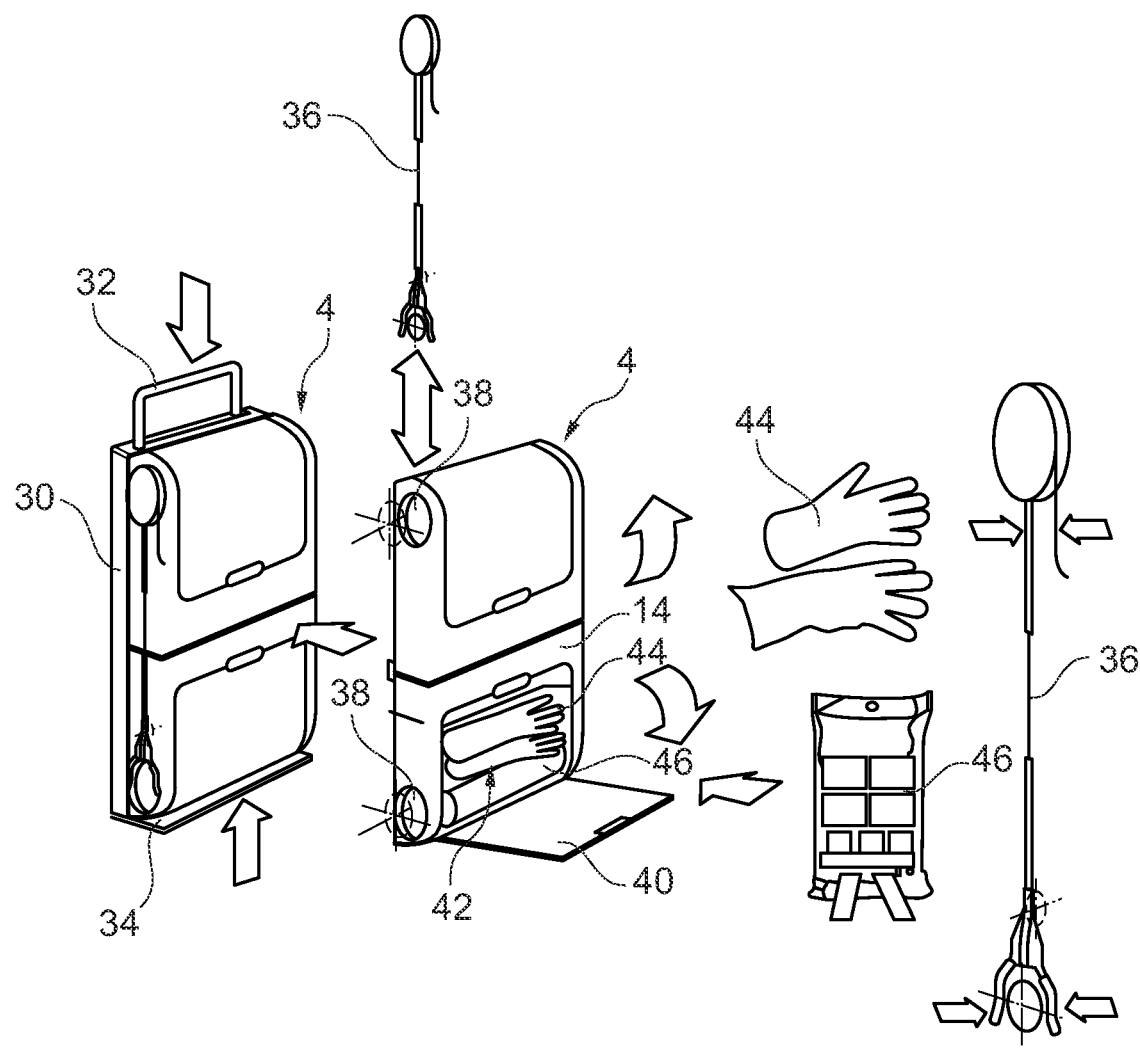
FIG. 5 shows the apparatus with a gripper and gloves.

As illustrated in FIG. 5, the apparatus 4 is equipped with an alternative retaining plate 30 which is attached thereto and which is equipped, by way of example, with a handle 32 and a contact surface 34. In this way, the apparatus 4 can also be set up outside of a cabin trolley 2 or another device in the aircraft cabin. In addition thereto, a gripper 36 is provided which can be attached to holders 38.

In these exemplary embodiments, the base plate 14 has a flap 40 which closes a stowage compartment 42. Different devices, for example fire-resistant gloves 44, a fire blanket 46 or the like, could be provided in said stowage compartment.

Figure 6:
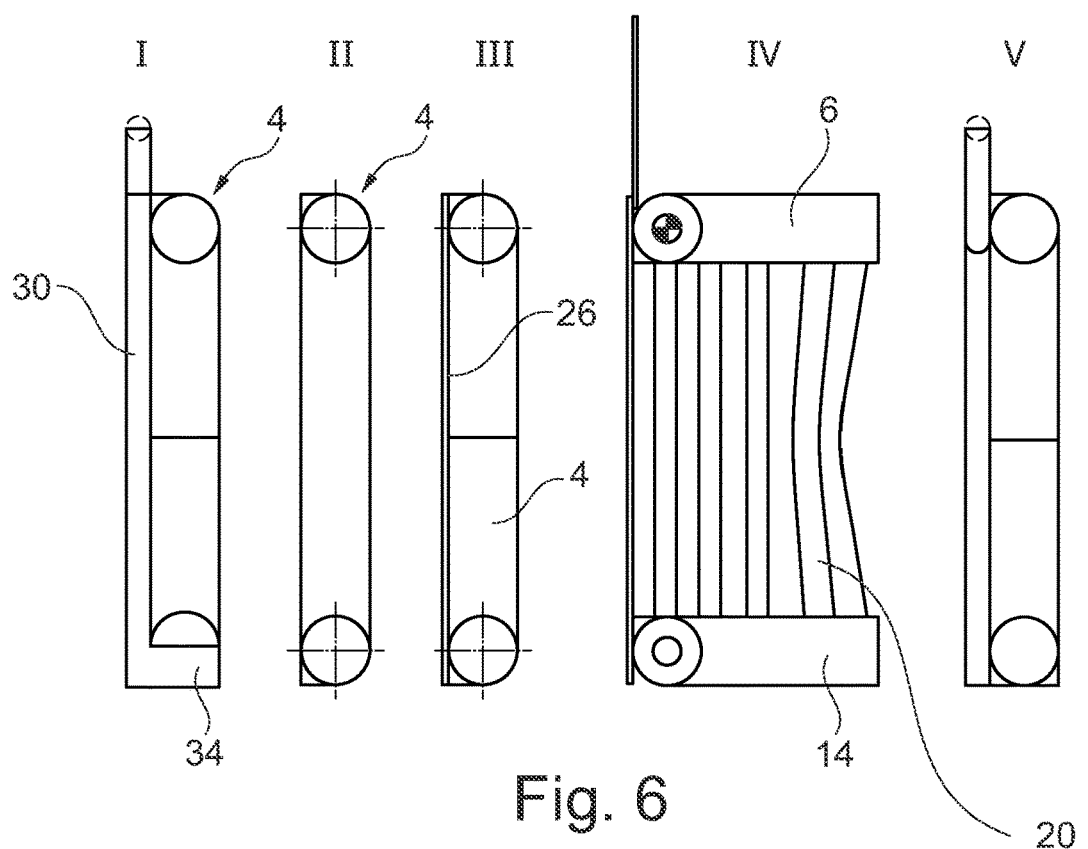
FIG. 6 shows side views of the apparatus in various embodiments.

FIG. 6 shows various views I to V of the apparatus 4. In I, the apparatus 4 with the retaining plate 30 is shown in a side view. In illustration II, the apparatus 4 is shown without any attachments and consequently comprises merely the wall 20, the opening frame 6 and the base plate 14. The retaining plate 26 shown above, which can be connected to the trolley 2, is arranged in III. In IV, the opening frame 6 and the base plate 14 have been pivoted open. V, however, shows the variant from illustration I without a contact surface.

Figure 7:
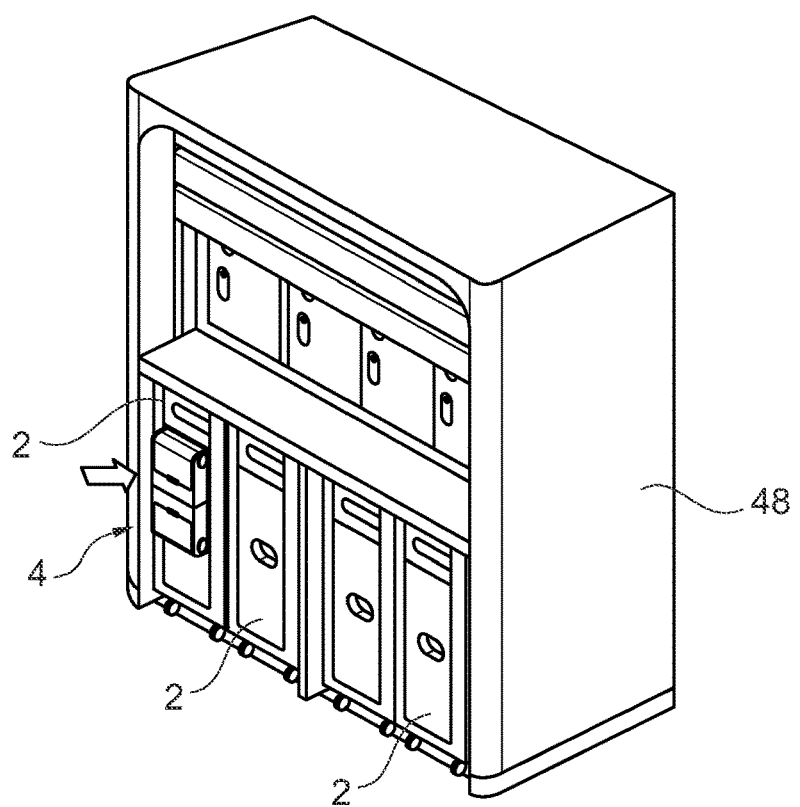
FIG. 7 shows a cabin monument with a trolley according to FIG. 1 arranged therein.

FIG. 7 illustrates a galley 48 in an aircraft cabin, in which a plurality of trolleys 2 are stored. Here, the apparatus 4 according to the invention is fastened to one of the trolleys 2. In the packed-down state shown there, the apparatus does not interfere with the customary operation of the galley 48.

In the case of need, which is shown in FIG. 8, a user 50 wearing fire-resistant gloves 44 uses the gripper 36 to grip, for example, a mobile electronic device 52 which, on account of a malfunction, is exhibiting an intense generation of heat. The apparatus 4 is located on the trolley 2 and the cover 8 of the opening frame 6 is open. The housing wall 20 is folded out and the user 50 can introduce the electronic device 52 into the cavity 22. Subsequently, the cavity 22 can be filled with a fire-extinguishing granular material 54 in order to extinguish the fire. As is shown in FIG. 10, the cover 8 is subsequently closed and the electronic device 52 no longer poses any risk.

Lastly, FIG. 11 shows an aircraft 56 with a passenger cabin 58 in which such an apparatus 4 can be used.

It is additionally pointed out that "having" or "comprising" does not rule out other elements or steps, and "a" or "an" does not rule out a multiplicity. It is also pointed out that features that have been described with reference to one of the above exemplary embodiments may also be used in combination with other features of other exemplary embodiments described above. Reference signs in the claims are not to be regarded as limiting.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE SIGNS

2 Cabin trolley
4 Apparatus
6 Opening frame
8 Flap
10 Opening
12 First bearing
14 Base plate
16 Second bearing
18 Intermediate space
20 Housing wall
22 Cavity
24 Retaining apparatus
25 Fastening element
26 Retaining plate
28 Rear side
30 Retaining plate
32 Handle
34 Contact surface 36 Gripper
38 Holder
40 Flap
42 Stowage compartment
44 Glove
46 Fire blanket
48 Galley
50 User
52 Electronic device
54 Fire-extinguishing granular material
56 Aircraft
58 Passenger cabin

The invention claimed is:

1. An apparatus for handling dangerous objects in a closed vehicle cabin, comprising:
   a retaining plate for fastening of the apparatus,
   a housing wall arranged on the retaining plate, and configured to be folded and composed of a refractory material, and
   an opening frame connected at least to the housing wall and having a closable opening,
   wherein the housing wall is configured to be folded to be brought into a folded state and into an expanded state, wherein, in the expanded state, the housing wall, together with the retaining plate and the opening frame, provides a cavity which can be reached from outside of the housing wall through the opening,
   wherein the opening frame is pivotably arranged on the retaining plate.

2. The apparatus according to claim 1, wherein the housing wall is configured to be folded and has a plurality of connected wall segments.

3. The apparatus according to claim 1, wherein the housing wall comprises a para-aramid reinforced material.

4. The apparatus according to claim 1, wherein the retaining plate has a releasable fastening element for arrangement on an object.

5. The apparatus according to claim 1, further comprising a granular material configured to be introduced into the cavity, for extinguishing a fire in the cavity.

6. The apparatus according to claim 1, wherein the opening frame is composed of a refractory material.

7. The apparatus according to claim 1, further comprising a gripper and a holder for holding the gripper on an outer side of the apparatus.

8. The apparatus according to claim 1, further comprising a closable compartment for storing a fire-resistant glove.

9. The apparatus according to claim 1, wherein the expanded state is dimensionally stable, and therefore the apparatus remains upright in the expanded state.

10. The apparatus according to claim 1, wherein, in the folded state, the housing wall and the opening frame rest flatly on the retaining plate.

11. The apparatus according to claim 10, further comprising a closable compartment for storing a fire-resistant glove, wherein the closable compartment is integrated in the base plate.

12. The apparatus according to claim 10, wherein the apparatus further comprises a base plate connected to the housing wall, and wherein the base plate is pivotably arranged on the retaining plate so as to lie opposite the opening frame.

13. The apparatus according to claim 12, wherein the opening frame and the base plate have substantially the same area.

14. A system for handling dangerous objects in a closed aircraft cabin, comprising:
    a cabin trolley; and
    at least one apparatus according to claim 1,
    wherein the cabin trolley comprises a retaining apparatus in which the retaining plate of the apparatus is configured to be mounted.

* * * * *